United States Patent
Ooi et al.

(10) Patent No.: US 7,514,668 B2
(45) Date of Patent: Apr. 7, 2009

(54) OPTICAL NAVIGATION DEVICE THAT UTILIZES A VERTICAL CAVITY SURFACE EMITTING LASER (VCSEL) CONFIGURED TO EMIT VISIBLE COHERENT LIGHT

(75) Inventors: Kwang Beng Ooi, Penang (MY); Li Chong Tai, Penang (MY); Shan Chong Tan, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/612,610

(22) Filed: Dec. 19, 2006

(65) Prior Publication Data

US 2008/0142691 A1  Jun. 19, 2008

(51) Int. Cl.
*G09G 5/08* (2006.01)
(52) U.S. Cl. .................................. 250/221; 345/156
(58) Field of Classification Search ............... 250/221, 250/222.1; 345/156, 162, 163, 166
See application file for complete search history.

(56) References Cited

U.S. PATENT DOCUMENTS

| | | |
|---|---|---|
| 5,644,139 A | 7/1997 | Allen et al. |
| 6,222,174 B1 | 4/2001 | Tullis et al. |
| 6,950,094 B2 | 9/2005 | Gordon et al. |
| 2002/0190953 A1 | 12/2002 | Gordon et al. |
| 2006/0267945 A1* | 11/2006 | Huang et al. ............... 345/166 |
| 2007/0109267 A1* | 5/2007 | Guo et al. .................... 345/166 |

OTHER PUBLICATIONS

Firecomms, "Visible Vertical Cavity Surface Emitting Laser in T0-46 Package", 2004, pp. 1-4.
Agilent Technologies, "Single-Mode Vertical-Cavity Surface Emitting Lasers (VCSEL) for Optical Illumination Applications", Technical Data, Preliminary Quattro-VCSEL Datasheet, Mar. 2004, p. 1-5.

* cited by examiner

*Primary Examiner*—Kevin Pyo (57) ABSTRACT

An optical navigation device includes a housing, a light source, a navigation sensor, and optics. In accordance with the invention, the light source is a vertical cavity surface emitting laser (VCSEL) that is configured to generate coherent light in the visible light spectrum. For example, the VCSEL generates red coherent light in the range of 600-700 nm. In an embodiment, the VCSEL generates red coherent light at 665 nm±20 nm. Because the light generated by the VCSEL is in the visible light spectrum, a human will sense contact with the corresponding beam and will naturally react to avoid injury. This enhances the overall safety of an optical mouse. Additionally, when using a VCSEL that generates visible red light, it is easy to visually determine whether or not the beam is focused directly on a measurement sensor during calibration.

19 Claims, 6 Drawing Sheets

OPTICAL NAVIGATION DEVICE THAT UTILIZES A VERTICAL CAVITY SURFACE EMITTING LASER (VCSEL) CONFIGURED TO EMIT VISIBLE COHERENT LIGHT

BACKGROUND OF THE INVENTION

An optical navigation device, such as an optical mouse, typically includes a navigation sensor that functions as a miniature digital camera to continually collect images of a surface that the device is sitting on and to determine the speed and direction that the device is being moved across the surface by comparing sequentially recorded frames of image information. Image frames are collected at a very high rate, such as 1,500 image frames per second, and the resolution of the navigation sensor is high enough to detect very small movements of the device relative to the surface.

Conventional optical navigation devices utilize a light emitting diode as the light source to illuminate the surface upon which the device sits. Next generation optical navigation devices are utilizing a vertical cavity surface emitting laser (VCSEL), which emits coherent light in the infrared (IR) spectrum (e.g., at about 830-865 nm), as the light source to illuminate the surface. Utilizing a VCSEL that generates coherent light in the IR spectrum as the light source in an optical mouse provides many advantages, including allowing the optical mouse to work on surfaces with fewer imageable features and providing higher resolution navigation than conventional LED-based devices.

Because the spectrum of visible light ranges from approximately 400-700 nm, the light used in conventional VCSEL-based optical navigation devices is invisible to the human eye. A laser beam generated from a VCSEL can be a safety hazard, especially if the beam is directed into the human eye. The danger of exposure to an invisible laser beam is enhanced by the fact that the beam cannot be seen.

In order to mitigate the danger of a laser beam used in an optical navigation device such as an optical mouse, the beam intensity of each VCSEL is measured and calibrated, if necessary, to ensure that the beam intensity does not exceed an intensity limit. However, because the beam is invisible, it is difficult to ensure that the beam output from an optical navigation device is accurately aligned with the measurement sensor.

SUMMARY OF THE INVENTION

An optical navigation device includes a housing, a light source, a navigation sensor, and optics. In accordance with the invention, the light source is a vertical cavity surface emitting laser (VCSEL) that is configured to generate coherent light in the visible light spectrum. For example, the VCSEL generates red coherent light in the range of 600-700 nm. In an embodiment, the VCSEL generates red coherent light at 665 nm±20 nm. Because the light generated by the VCSEL is in the visible light spectrum, a human will sense contact with the corresponding beam and will naturally react to avoid injury. This enhances the overall safety of an optical mouse. Additionally, when using a VCSEL that generates visible red light, it is easy to visually determine whether or not the beam is focused directly on a measurement sensor during calibration.

The use of a VCSEL that is configured to generate coherent light in the visible spectrum can be leveraged to provide the optical navigation device with dual functionality. In accordance with an embodiment of the invention, the optical navigation device is configured so that it can be used as a traditional optical mouse or as a laser pointer. That is, the optical navigation device is configured so that it can operate in a first mode as an optical mouse and in a second mode as a laser pointer. The optical navigation device can be enabled to function as an optical mouse or as a laser pointer using, for example, a VCSEL redirection mechanism or a beam redirection mechanism.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers may be used to identify similar elements.

DETAILED DESCRIPTION OF THE INVENTION

Figure 1:
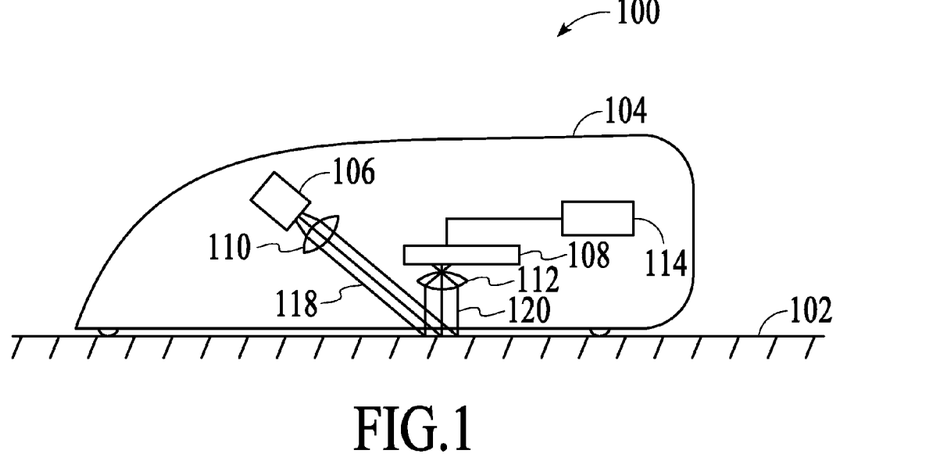
FIG. 1 is a cross-sectional side view of an optical navigation device, referred to generally herein as an "optical mouse," which sits on and moves over a work surface such as a desktop.

FIG. 1 is a cross-sectional side view of an optical navigation device 100, referred to generally herein as an "optical mouse," which sits on and moves over a work surface 102 such as a desktop. The optical mouse includes a housing 104, a light source 106, a navigation sensor 108, optics 110 and 112, and a communications module 114, where the light source, the navigation sensor, the optics, and the communications module are mounted within the housing. The light source illuminates a spot on the work surface with collimated light 118 that strikes the work surface at a shallow angle in order to illuminate imageable features on the work surface. A portion of the light 120 is reflected from the illuminated spot on the work surface and is detected by the navigation sensor. In an embodiment, the navigation sensor includes an array of distinct photodetectors (not shown), for example, a 16×16 or 32×32 array of distinct photodetectors configured to detect light that is reflected from the illuminated spot on the top surface. In an embodiment, the photodetectors are complementary metal-oxide semiconductor (CMOS) photodetectors. Each of the photodetectors in the array generates light intensity information that is output as a digital value (e.g., an 8-bit digital value). Image information is captured in frames, where a frame of image information includes a set of simultaneously captured values for each distinct photodetector in the array. Image frames captured by the photodetector array include data that represents imageable features on the work surface. The rate of image frame capture is programmable and, for example, ranges up to 6,400 frames per second. In an embodiment, the photodetector array has a resolution of 800 counts per inch (cpi).

The navigation sensor 108 also includes a navigation engine (not shown) which compares successive image frames to determine the movement of image features between frames. In particular, the navigation engine determines movement by correlating common features that exist in successive image frames. The movement between image frames is expressed in terms of movement vectors in, for example, the X and Y directions (e.g., ΔX and ΔY). The movement vectors are then used to determine the movement of the optical navigation device relative to the work surface. More detailed descriptions of exemplary optical navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein. Additionally, an exemplary optical navigation device is described in U.S. Pat. No. 6,950,094, entitled SEEING EYE MOUSE FOR A COMPUTER SYSTEM, which is incorporated by reference herein.

Referring to FIG. 1, the optics 110 and 112 manipulate the light from the light source to illuminate a spot on the work surface 102 and to focus reflected light 120 from the illuminated spot onto the navigation sensor 108. The optics are implementation specific and may be applied to the portion of the light between the VCSEL and the work surface, the reflected portion of the light, or both portions of the light. The optics may include a combination of optical devices including, for example, collimating lenses, focusing lenses, and reflectors. In order for movement tracking to be effective, the reflected light must be focused onto the navigation sensor. In an embodiment, the optics include a lens that is configured and positioned to focus an image of the illuminated spot onto the navigation sensor. The focal point of a lens is a function of the lens itself and the distance between the lens and the object to be imaged. The details of the optics design are highly dependent on the spatial relationship between the light source 106, the navigation sensor, and the work surface. It should be understood that many design configurations can be implemented without deviating from the scope of the invention, which is defined by the claims. In some instances, optics may not be necessary.

The communications module 114 enables the optical mouse 100 to communicate movement information to another device, for example, a personal computer. The communications module can be any type of wired or wireless communications port that supports the communication of movement information. Exemplary communications ports include wireless transmitters or transceivers, RS-232 ports, RJ-45 ports, and a Universal Serial Bus (USB) port.

Figure 2:
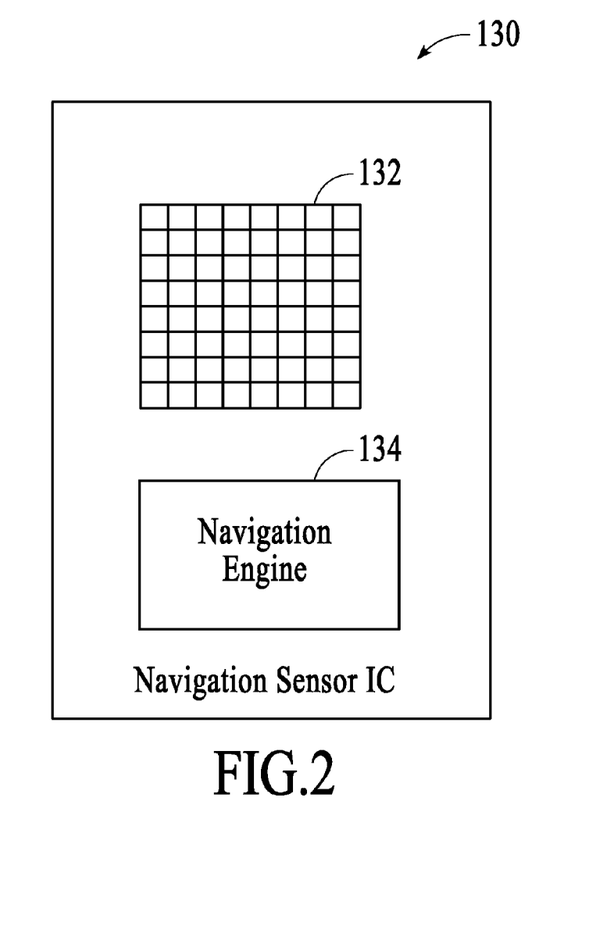
FIG. 2 depicts an example of an integrated circuit that includes a photodetector array and a navigation engine.

In an embodiment, the photodetector array and navigation engine are fabricated onto a single integrated circuit (IC). FIG. 2 depicts an example of a navigation sensor IC 130 that includes the photodetector array 132 and the navigation engine 134 described with reference to FIG. 1. In another embodiment, additional functionality, including for example, the functionality of the communications module, or some portion thereof, can be incorporated into the same IC.

In accordance with an embodiment of the invention, the light source 106 is a vertical cavity surface emitting laser (VCSEL) that is configured to generate coherent light in the visible light spectrum. For example, the VCSEL generates coherent light in the range of 600-700 nm. In an embodiment, the VCSEL generates light at 665 nm±20 nm. Although particular visible light spectrum ranges are described, the coherent light generated from VCSEL can be in any range that fall within the visible light spectrum.

Using a VCSEL that generates light in the visible light spectrum for an optical navigation device provides various advantages over a conventional laser-based optical mouse, which uses a VCSEL that generates light in the IR range. These advantages include, but are not limited to, the following:

1) Because the light is visible, a human will sense contact with the corresponding beam and will naturally react to avoid injury. This enhances the overall safety of an optical mouse.

2) A CMOS photodetector array is more responsive to light in the visible red spectrum (e.g., in the range of 600-700 nm) than to light in the IR spectrum (e.g., in the 800-900 nm range). A comparison of sensor response vs. wavelength for a CMOS photodetector array is described below with reference to FIG. 7. Since a CMOS photodetector array is more responsive to visible red light than to IR light, the optical power required to produce the desired response is reduced in comparison to a system that uses IR light.

3) In optical navigation devices that utilize invisible IR light, an extra LED is often used to indicate whether the VCSEL is on or off. Because visible light is used instead of IR light, it is easy to visually determine if the VCSEL is on or off and therefore there is no need for an extra indicator LED.

4) During assembly of a laser-based optical navigation device, the output intensity of the VCSEL in combination with the associated optics must be measured to ensure that certain safety limits are met. When using a VCSEL that generates visible red light, it is easy to visually determine whether or not the beam is focused directly onto a measurement sensor.

Figure 3A:
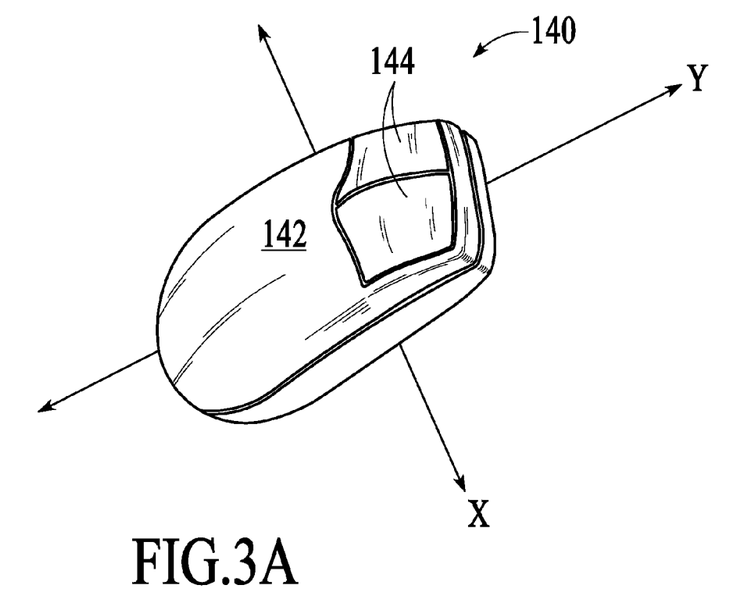
FIG. 3A depicts a top perspective view of an optical mouse.
Figure 3B:
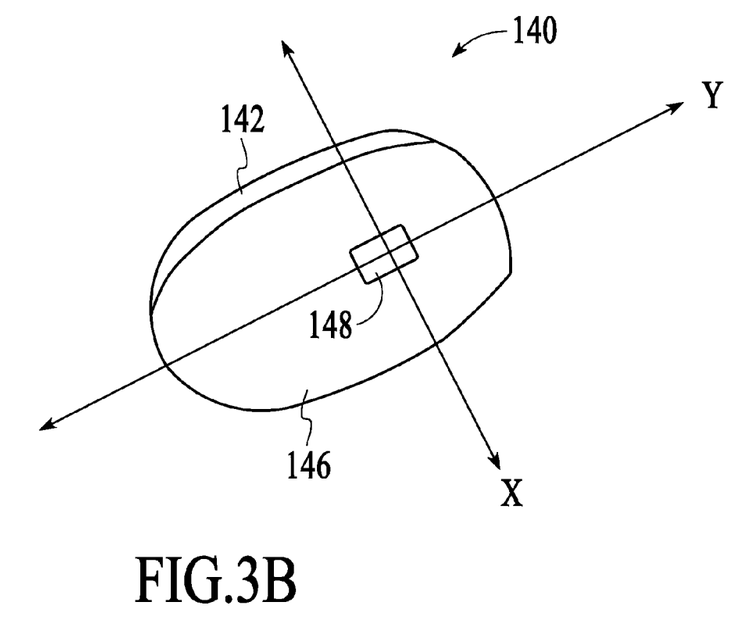
FIG. 3B depicts a bottom perspective view of the optical mouse from FIG. 3A.

FIG. 3A depicts a top perspective view of an optical mouse 140. This top perspective view depicts the upper surface 142 of the housing and two functional buttons 144 as is known in the field. In the embodiment of FIG. 3A and as is known in the field, the upper surface of the housing is shaped to receive a human hand. FIG. 3B depicts a bottom perspective view of the optical mouse. The bottom perspective view depicts a portion of the upper surface, the bottom surface 146, and an aperture 148 in the bottom surface. The aperture in the bottom surface of the housing allows light from the light source to illuminate the work surface upon which the mouse sits and allows reflected light to be detected by the navigation sensor. FIGS. 3A and 3B also depict exemplary navigation axes X and Y relative to the optical mouse.

Figure 4:
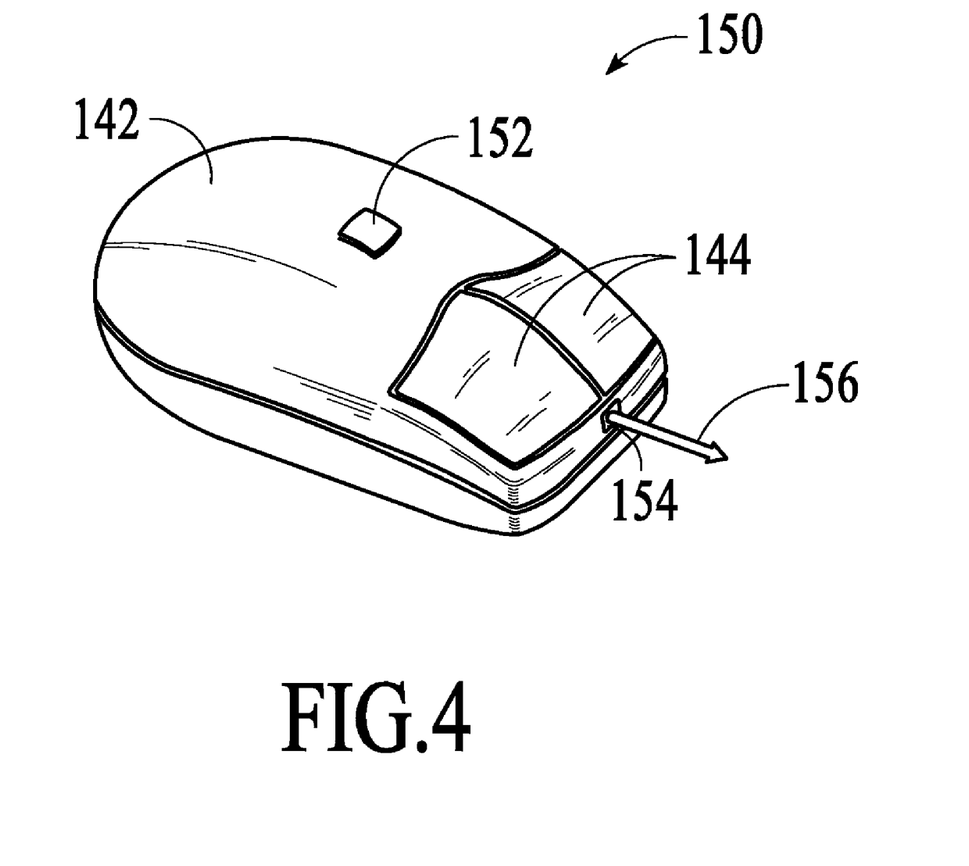
FIG. 4 depicts a top perspective view of an optical navigation device that is in laser pointer mode.

The use of a VCSEL that is configured to generate coherent light in the visible spectrum can be leveraged to provide an optical navigation device with dual functionality. In an embodiment, an optical navigation device is configured so that it can be used as a conventional optical mouse or as a laser pointer. That is, in a first mode, the optical navigation device is used on a work surface as an optical mouse and in a second mode, the same optical navigation device is used in free space as a laser pointer. FIG. 4 depicts a top perspective view of an optical navigation device 150 that is in laser pointer mode. The optical navigation device includes a mode switch 152, which enables switching between optical mouse mode and laser pointer mode, and an aperture 154 in the upper surface of the housing. In laser pointer mode, a beam of visible light 156 (e.g., visible red light) exits the housing through the aperture in the upper surface. When in laser pointer mode, a user can hold the mouse and move the mouse in free space to point with the emitted beam of visible light.

The mechanism that allows the optical navigation device 150 to function as an optical mouse or as a laser pointer is implementation specific. Some exemplary embodiments are described below with reference to FIGS. 5A-6B.

Figure 5A:
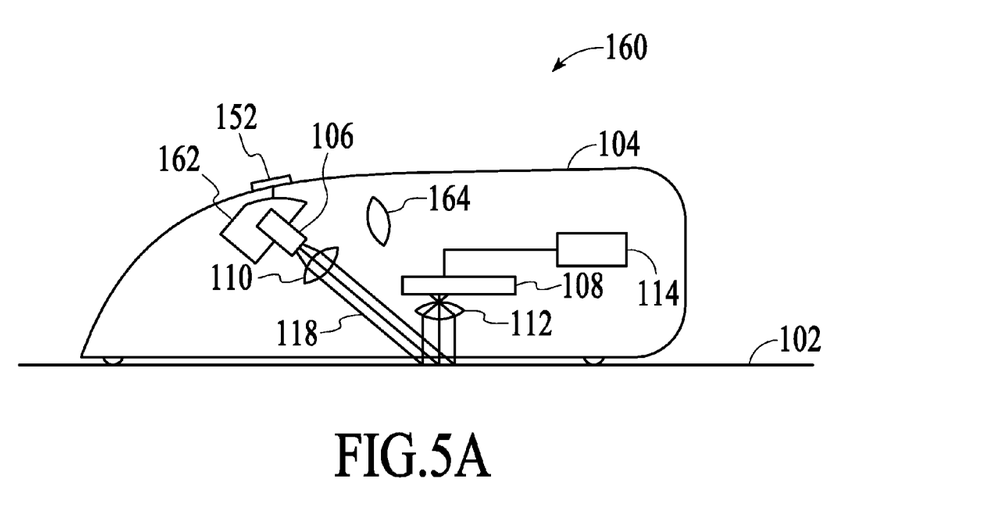
FIGS. 5A and 5B depict cross-sectional side views of an optical navigation device, which includes a VCSEL repositioning mechanism, in an optical mouse mode and a laser pointer mode, respectively.
Figure 5B:
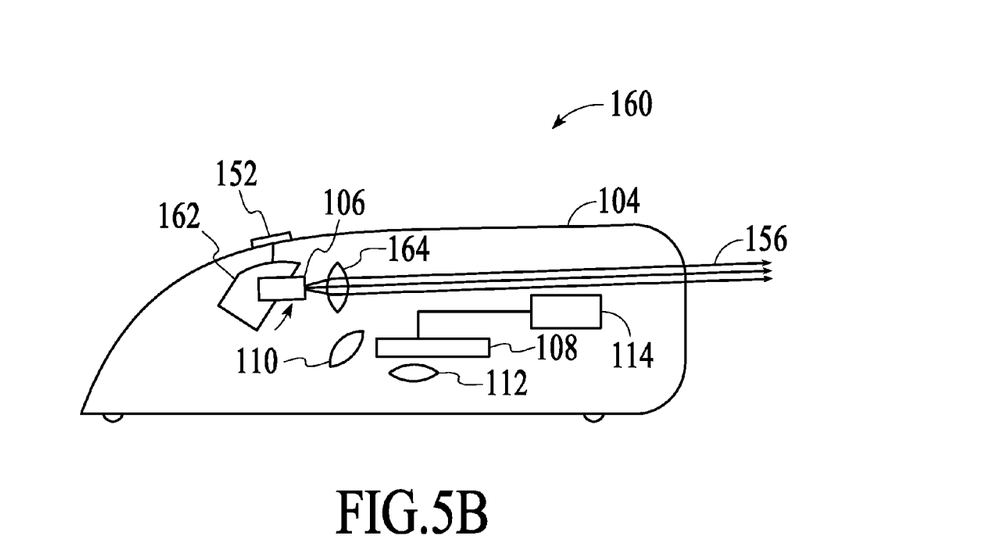

FIGS. 5A and 5B depict cross-sectional side views of an optical navigation device 160, similar to that of FIG. 1, which includes a VCSEL repositioning mechanism 162 that enables the optical navigation device to be switched between an optical mouse mode and a laser pointer mode. In particular, the VCSEL repositioning mechanism enables the VCSEL 106 to be rotated from the position depicted in FIG. 5A to the position depicted in FIG. 5B. In the position of FIG. 5A (the optical mouse or "navigation" position), the VCSEL directs visible light towards the collimating lens 110, which collimates the light into a beam 118 that is directed towards the navigation surface 102. In the position of FIG. 5B (the laser pointer or "pointing" position), the VCSEL directs the visible light in a different direction towards a different collimating lens 164. The corresponding lens collimates the light into a beam 156 that exits the upper surface of the housing through an aperture (FIG. 4) in the upper surface. With the beam exiting the housing from the upper surface, the optical mouse can be used as a laser pointer while the optical mouse is held in a manner similar to when the optical mouse is used for conventional navigation operations. In an alternative embodiment, the VCSEL and a single collimating lens are part of a module that rotates to change between the optical mouse and laser pointer modes. Although a particular embodiment of the VCSEL repositioning mechanism is described with reference to FIGS. 5A and 5B, the VCSEL repositioning mechanism can be any mechanism that allows the VCSEL to be positioned as needed to accommodate the above-described dual modes.

The embodiment of FIGS. 5A and 5B also includes a user interface such as a mode switch 152 that is used to control the repositioning of the VCSEL 106 between the position depicted in FIG. 5A and the position depicted in FIG. 5B. In an embodiment, the mode switch is a mechanical button that is accessible by a user at the upper surface of the optical navigation device. Other implementations of a mode switch are possible. In an embodiment, the user interface is a graphical user interface that is presented on a personal computer with which the mouse communicates.

Figure 6A:
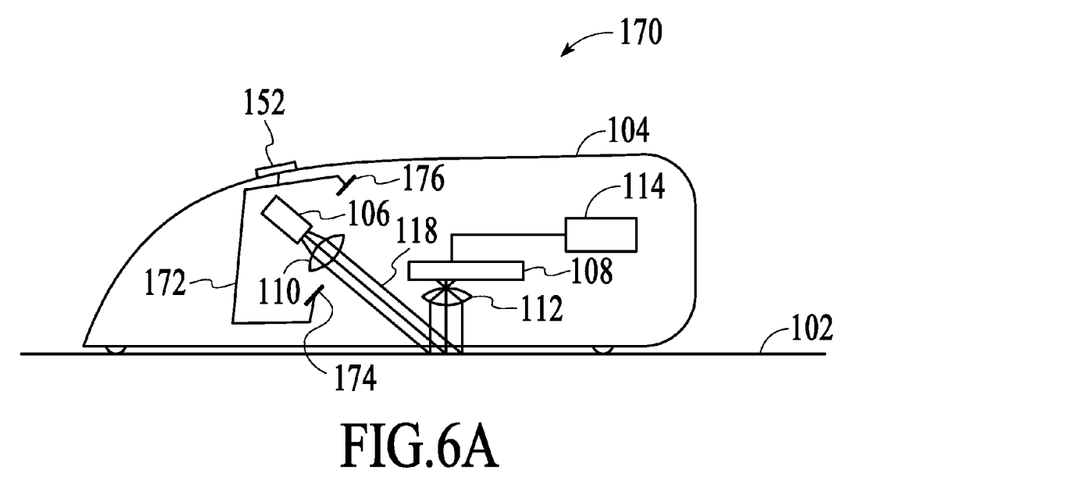
FIGS. 6A and 6B depict cross-sectional side views of an optical navigation device, which includes a beam repositioning mechanism, in an optical mouse mode and a laser pointer mode, respectively.
Figure 6B:
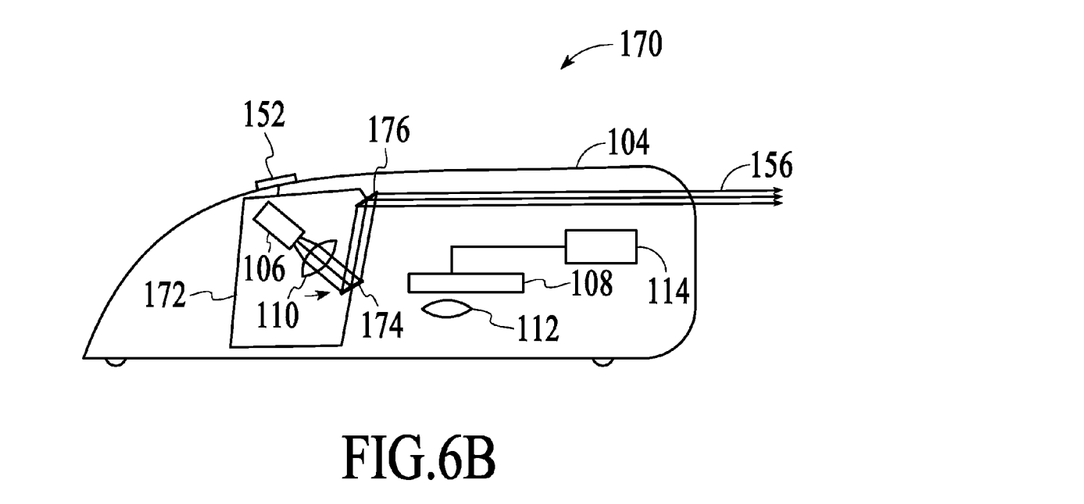

FIGS. 6A and 6B depict cross-sectional views of an optical navigation device 170, similar to that of FIG. 1, which uses a different mechanism to switch from an optical mouse mode to a laser pointer mode. In this embodiment, the optical navigation device includes a beam redirection mechanism 172 that repositions the visible beam from a position that enables navigation tracking to a position that enables laser pointing. In the embodiment of FIGS. 6A and 6B, the beam repositioning mechanism includes two mirrors 174 and 176 that can be actuated or moved into position in response to a signal from a mode switch 152. When in optical mouse mode (FIG. 6A), mirrors 174 and 176 do not reflect the beam. When in laser pointer mode (FIG. 6B), mirrors 174 and 176 are repositioned to reflect the beam such that the beam 156 exits through an aperture (FIG. 4) in the upper surface of the housing. Although one beam repositioning mechanism is described with reference to FIGS. 6A and 6B, other beam repositioning mechanisms are possible.

Although two examples of mechanisms for switching between an optical mouse mode and a laser pointer mode are described with reference to FIGS. 4-6B, other mechanisms are possible. For example, mechanisms that include repositioning of the VCSEL 106 and redirection of the beam 156 are possible. It should be understood that many design configurations can be implemented without deviating from the scope of the invention, which is defined by the claims.

In the embodiments described above with reference to FIGS. 4-6B, the exit point of the light beam for use in laser pointing is at the upper surface of the housing. In other embodiments, the laser pointing exit point could be at the bottom surface.

Figure 7:
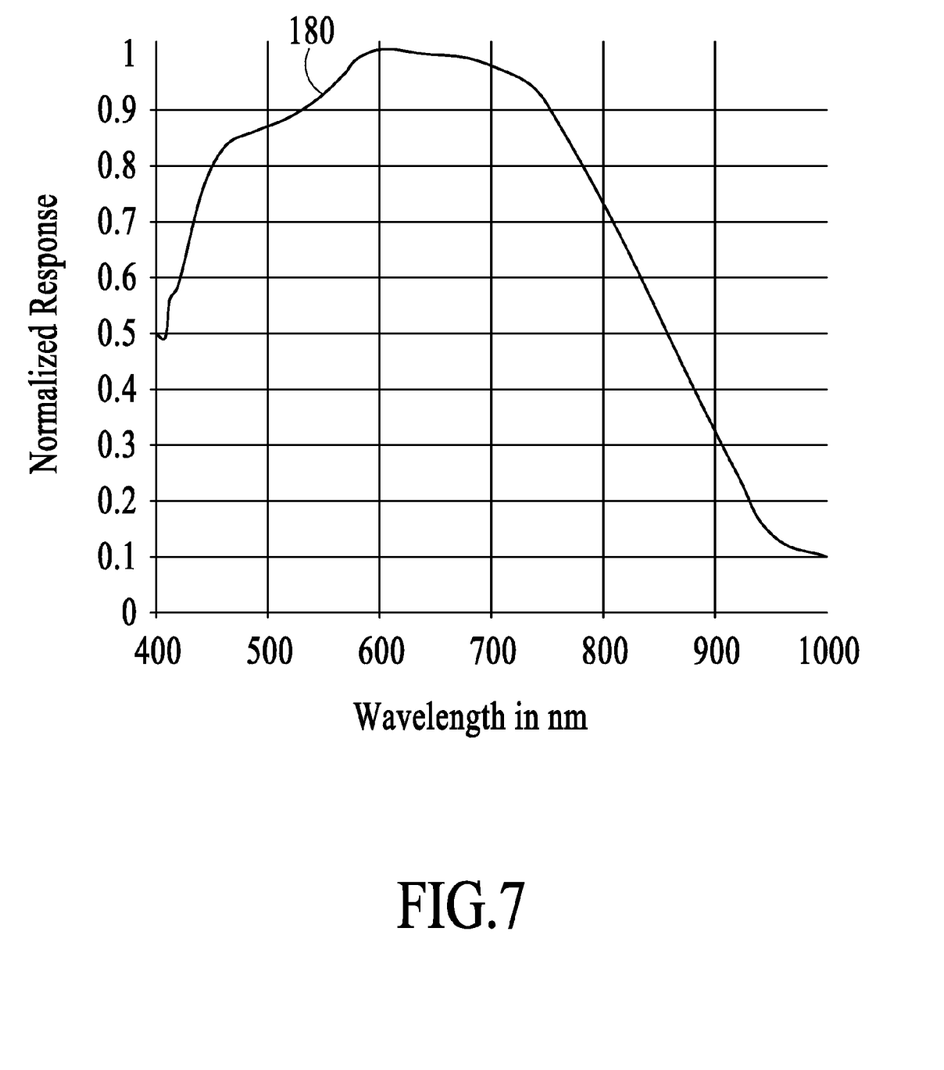
FIG. 7 is a graph of sensor response vs. wavelength for a CMOS photodetector array.

FIG. 7 is a graph of sensor response vs. wavelength for a CMOS photodetector array. As depicted in FIG. 7, the sensor response 180 in the wavelength range of 600-700 nm (i.e., visible red light) is nearly twice as great as the sensor response in the wavelength range of 800-900 nm (i.e., IR light). Because a CMOS photodetector array is more responsive to visible red light than to IR light, the optical power required to produce the desired response is reduced in comparison to a system that uses IR light.

Although specific embodiments of the invention have been described and illustrated, the invention is not to be limited to the specific forms or arrangements of parts as described and illustrated herein. The invention is limited only by the claims.

What is claimed is:

1. An optical navigation device for tracking movement relative to a work surface, the optical navigation device comprising:
   a housing;
   a vertical cavity surface emitting laser (VCSEL) mounted within the housing and configured to generate a coherent light in the visible light spectrum;
   a VCSEL repositioning mechanism that is configured to position the VCSEL in a navigation position and a pointing position;
   a navigation sensor mounted within the housing; and
   optics mounted within the housing;
   wherein the VCSEL, the navigation sensor, and the optics are configured, in the navigation position, within the housing such that the coherent light emitted from the VCSEL is incident on the work surface and such that a reflected portion of the coherent light is detected by the navigation sensor; and
   wherein the navigation sensor captures image frames in response to the reflected portion of the coherent light and generates relative movement information in response to the captured image frames.

2. The optical navigation device of claim 1 wherein the VCSEL generates coherent light in the range of 600-700 nm.

3. The optical navigation device of claim 1 wherein the VCSEL generates coherent light at 665 nm±20 nm.

4. The optical navigation device of claim 1 further comprising means for changing the exit point of the coherent light from a bottom surface to an upper surface of the housing or from the upper surface to the bottom surface of the housing.

5. The optical navigation device of claim 4 wherein the means for changing the exit point comprises a user interface configured to change the exit point of the coherent light from the bottom surface to the upper surface or from the upper surface to the bottom surface in response to a user action.

6. The optical navigation device of claim 5 wherein the VCSEL repositioning mechanism is further configured, in the navigation position, to direct the coherent light through an aperture in the bottom surface of the housing and, in the pointing position, to direct the coherent light through an aperture in the upper surface of the housing.

7. The optical navigation device of claim 1 wherein the VCSEL repositioning mechanism is further configured, in the navigation position, to direct the coherent light through an aperture in a bottom surface of the housing and, in the pointing position, to direct the coherent light through an aperture in an upper surface of the housing.

8. The optical navigation device of claim 1 wherein the navigation sensor comprises a sensor array and a tracking engine on the same integrated circuit.

9. An optical navigation device comprising:
a housing having a bottom surface that moves against a work surface having imageable features, the housing also having an upper surface shaped to receive a human hand;
an aperture in the bottom surface;
a vertical cavity surface emitting laser (VCSEL) configured to generate coherent light in the visible spectrum and mounted within the housing proximate the aperture in the bottom surface and oriented relative to the aperture such that light emitted from the VCSEL illuminates imageable features on the work surface;
a VCSEL repositioning mechanism that is configured to position the VCSEL in a navigation position and a pointing position; and
a navigation sensor mounted within the housing and proximate the aperture, the navigation sensor configured to capture image frames in response to illumination of the imageable features on the work surface and to generate relative movement information in response to the captured image frames.

10. The optical navigation device of claim 9 wherein the VCSEL generates coherent light in the range of 600-700 nm.

11. The optical navigation device of claim 9 wherein the VCSEL generates coherent light at 665 nm±20 nm.

12. The optical navigation device of claim 9 further comprising means for changing the exit point of the coherent light from the bottom surface to the upper surface or from the upper surface to the bottom surface.

13. The optical navigation device of claim 12 wherein the means for changing the exit point comprises a user interface configured to change the exit point of the coherent light from the bottom surface to the upper surface or from the upper surface to the bottom surface in response to a user action.

14. The optical navigation device of claim 13 wherein the VCSEL repositioning mechanism is further configured, in the navigation position, to direct the coherent light through the aperture in the bottom surface of the housing and, in the pointing position, to direct the coherent light through an aperture in the upper surface of the housing.

15. The optical navigation device of claim 9 wherein the navigation sensor comprises a sensor array and a tracking engine on the same integrated circuit.

16. The optical navigation device of claim 1 wherein the optics mounted within the housing comprise a first collimating lens and a second collimating lens, wherein the VCSEL repositioning mechanism is further configured, in the navigation position, to direct the coherent light towards the first collimating lens and, in the pointing position, to direct the coherent light towards the second collimating lens.

17. The optical navigation device of claim 1 wherein the optics mounted within the housing comprise a collimating lens, wherein the VCSEL repositioning mechanism is further configured to rotate the VCSEL and the collimating lens together to change between the navigation position and the pointing position.

18. The optical navigation device of claim 9 wherein the VCSEL repositioning mechanism is further configured, in the navigation position, to direct the coherent light through an aperture in the bottom surface of the housing and, in the pointing position, to direct the coherent light through an aperture in the upper surface of the housing.

19. The optical navigation device of claim 9 wherein the VCSEL repositioning mechanism is further configured to rotate the VCSEL to change between the navigation position and the pointing position.

* * * * *